United States Patent
Eckert et al.

(10) Patent No.: US 11,240,645 B2
(45) Date of Patent: Feb. 1, 2022

(54) ROAD-SIDE NETWORK NODE AND METHOD TO OPERATE THE ROAD-SIDE NETWORK NODE

(71) Applicant: Robert Bosch GmbH, Stuttgart (DE)

(72) Inventors: Kurt Eckert, Ditzingen (DE); Nadia Brahmi, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 16/755,266

(22) PCT Filed: Sep. 19, 2018

(86) PCT No.: PCT/EP2018/075361
§ 371 (c)(1),
(2) Date: Apr. 10, 2020

(87) PCT Pub. No.: WO2019/091648
PCT Pub. Date: May 16, 2019

(65) Prior Publication Data
US 2020/0245112 A1    Jul. 30, 2020

(30) Foreign Application Priority Data
Nov. 13, 2017 (EP) .................................. 17201345

(51) Int. Cl.
*H04W 4/00* (2018.01)
*H04W 4/40* (2018.01)
(Continued)

(52) U.S. Cl.
CPC ............. *H04W 4/40* (2018.02); *H04W 48/16* (2013.01); *H04W 72/04* (2013.01); *H04W 84/18* (2013.01); *H04W 88/16* (2013.01)

(58) Field of Classification Search
CPC ....... H04W 4/40; H04W 88/16; H04W 72/04; H04W 48/16
(Continued)

(56) References Cited

U.S. PATENT DOCUMENTS 9,735,976 B2 * 8/2017 Stahlin .................... H04W 4/44
10,117,053 B2 * 10/2018 Park ...................... H04W 4/023
(Continued)

OTHER PUBLICATIONS

International Search Report for PCT/EP2018/075361, dated Oct. 16, 2018.
(Continued)

*Primary Examiner* — Marceau Milord
(74) *Attorney, Agent, or Firm* — Norton Rose Fulbright US LLP; Gerard Messina

(57) ABSTRACT

A method to operate a road-side network node in a cell-supported radio communications network and in an adhoc radio communications network is provided. The method comprises: discovering at least one further road-side network node in the vicinity of the road-side network node as a gateway node, wherein the at least one further road-side node has the capability to exchange data across the cell-supported radio communications network and the adhoc radio communications network; and exchanging data across the cell-supported radio communications network and the adhoc radio communications network in dependence on the discovered at least one further road-side network node.

11 Claims, 12 Drawing Sheets

(51) Int. Cl.
*H04W 48/16* (2009.01)
*H04W 72/04* (2009.01)
*H04W 84/18* (2009.01)
*H04W 88/16* (2009.01)

(58) Field of Classification Search
USPC .................................. 370/329, 338, 328, 255
See application file for complete search history.

(56) References Cited

U.S. PATENT DOCUMENTS

| | | | | |
|---|---|---|---|---|
| 10,598,540 | B2* | 3/2020 | Turner | G01G 11/003 |
| 10,716,167 | B2* | 7/2020 | Edwards | H04W 76/14 |
| 10,820,245 | B2* | 10/2020 | Hahn | H04W 36/0016 |
| 10,952,043 | B2* | 3/2021 | Nguyen | H04W 56/0015 |
| 10,993,083 | B2* | 4/2021 | Byun | H04W 24/02 |
| 11,039,410 | B2* | 6/2021 | Li | H04W 72/04 |
| 2008/0200121 | A1* | 8/2008 | Yamamoto | G08G 1/093 455/41.2 |
| 2009/0279462 | A1* | 11/2009 | Luo | H04L 47/50 370/310 |
| 2014/0204923 | A1 | 7/2014 | Ayadurai et al. | |
| 2014/0354451 | A1 | 12/2014 | Tonguz et al. | |
| 2017/0238270 | A1* | 8/2017 | Shen | H04W 4/46 370/336 |
| 2017/0251486 | A1* | 8/2017 | Hu | H04W 72/0406 |
| 2017/0339588 | A1* | 11/2017 | Moon | H04W 76/27 |
| 2018/0184270 | A1* | 6/2018 | Chun | H04W 24/08 |
| 2018/0242190 | A1* | 8/2018 | Khoryaev | H04L 47/283 |
| 2019/0069052 | A1* | 2/2019 | Al-Stouhi | H04Q 9/00 |
| 2019/0289627 | A1* | 9/2019 | Blasco Serrano | H04W 56/00 |
| 2019/0313375 | A1* | 10/2019 | Loehr | H04W 72/04 |
| 2019/0327587 | A1* | 10/2019 | Hahn | H04W 76/27 |
| 2019/0327618 | A1* | 10/2019 | Li | H04W 4/029 |
| 2019/0335532 | A1* | 10/2019 | Kim | H04W 4/40 |
| 2019/0357158 | A1* | 11/2019 | Li | H04W 56/001 |

OTHER PUBLICATIONS

Abd-Elrahman Emad et al: "A hybrid model to extend vehicular intercommunication V2V through D2D architecture", 2015 International Conference On Computing, Networking and Communications (ICNC), IEEE, Feb. 16, 2015, pp. 754-759, XP032752678.
Cao Xianghui et al: "On Optimal Device-to-Device Resource Allocation for Minimizing End-to-End Delay in VANETs", IEEE Transactions on Vehicular Technology, IEEE Service Center, Piscataway, NJ, US, vol. 65, No. 10, Oct. 1, 2016, pp. 7905-7916, XP011625784.
3GPP TS 36.300 V14.2.0 (Mar. 2017), 330 pages.
"IEEE 802.11P-2010—IEEE Standard for Information Technology—Local and Metropolitan Area Networks—Specific Requirements—Part 11: Wireless LAN Medium Access Control (MAC) and Physical Layer (PHY) Specifications, Amendment 6: Wireless Access in Vehicular Environments", 51 pages.
ETSI EN 302 663 V1.2.0 (Nov. 2012), 24 pages.
ETSI TS 102 687 V1.1.1 (Jul. 2011), 45 pages.
3GPP TS 36.201 V14.1.0 (Mar. 2017), 15 pages.
3GPP TS 36.211 V14.4.0 (Sep. 2017) 197 pages.
3GPP TS 36.212 V14.4.0 (Sep. 2017) 198 pages.
3GPP TS 36.213 V14.4.0 (Sep. 2017) 462 pages.
3GPP TS 36.214 V14.3.0 (Sep. 2017) 22 pages.
3GPP TS 36.216 V14.0.0 (Mar. 2017) 16 pages.
3GPP TS 23.285 V14.2.0 (Mar. 2017) 35 pages.
"IEEE 802.11TM-2016—IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Speccifications", 3534 pages.

* cited by examiner

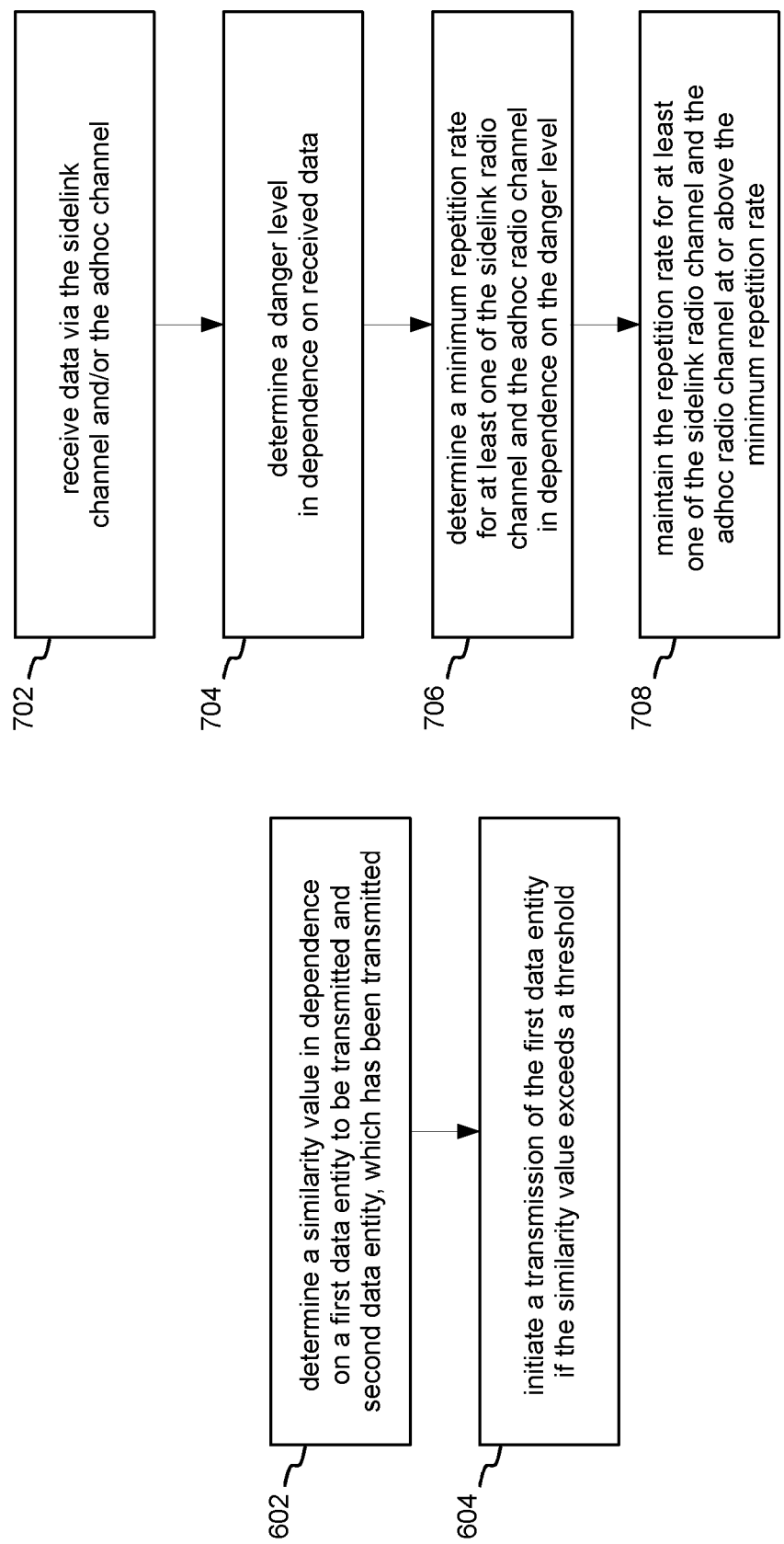

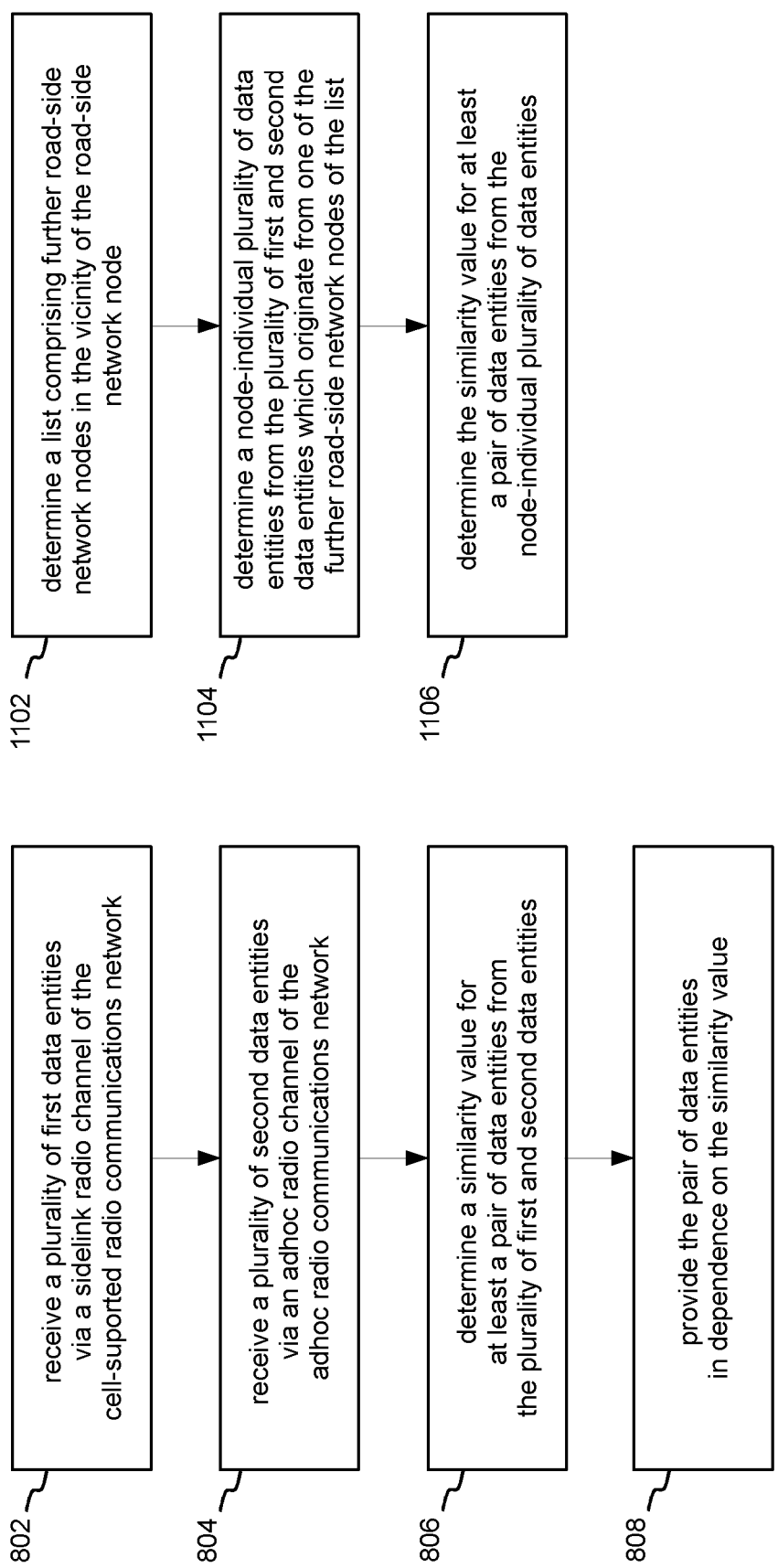

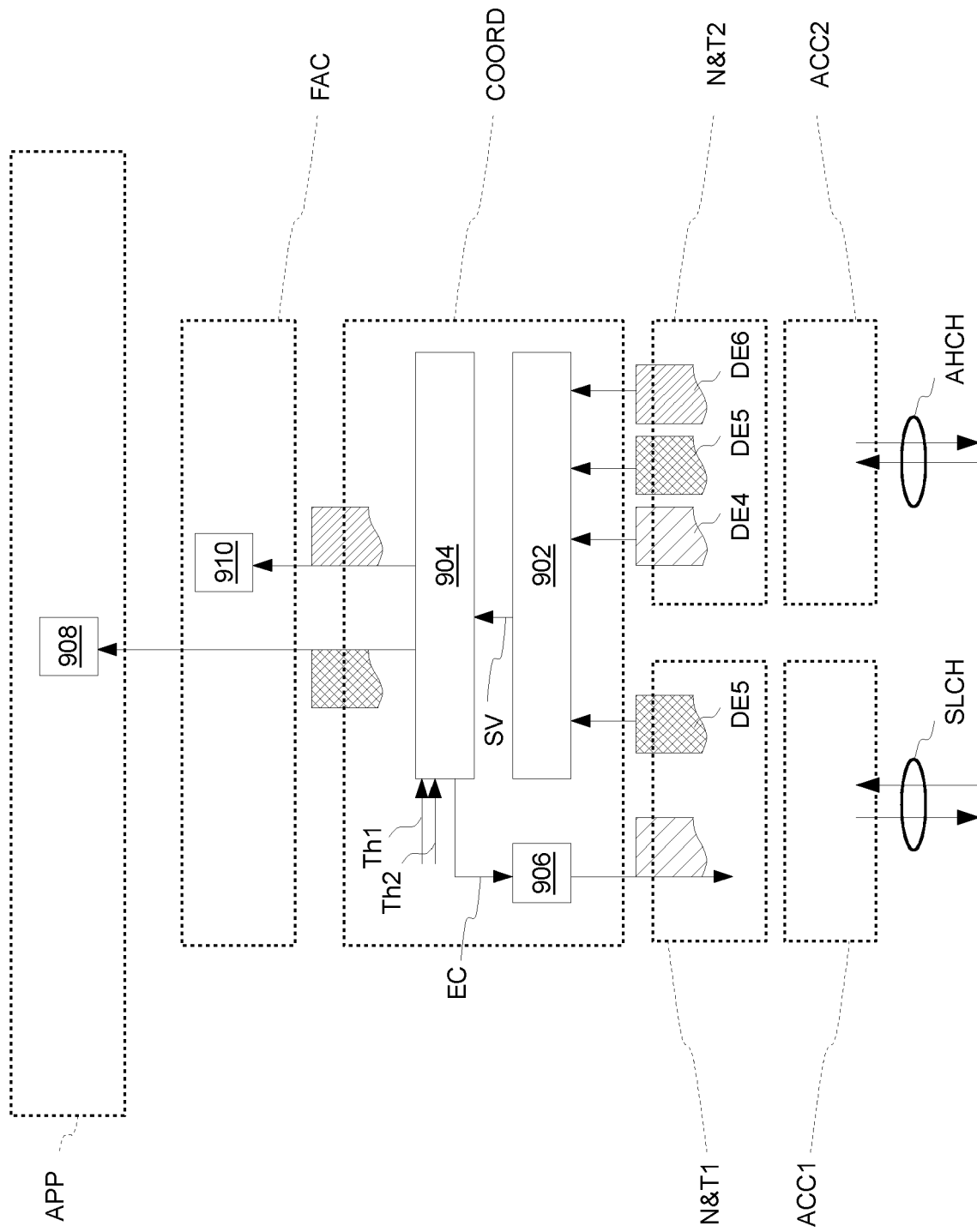

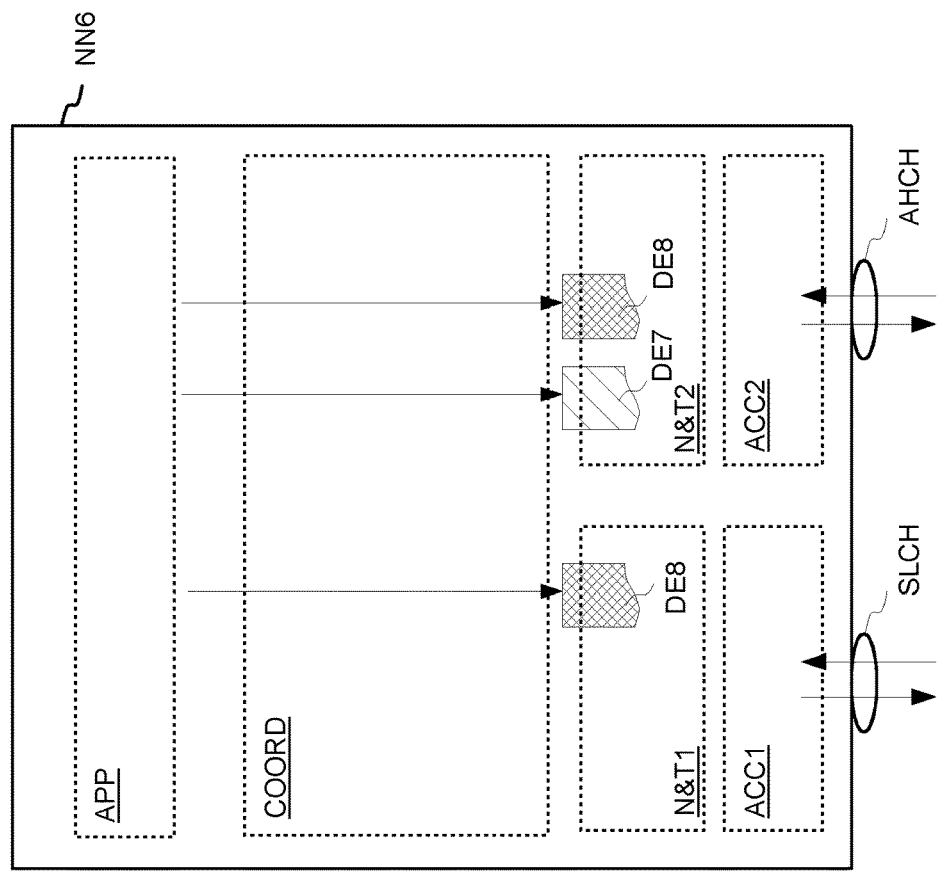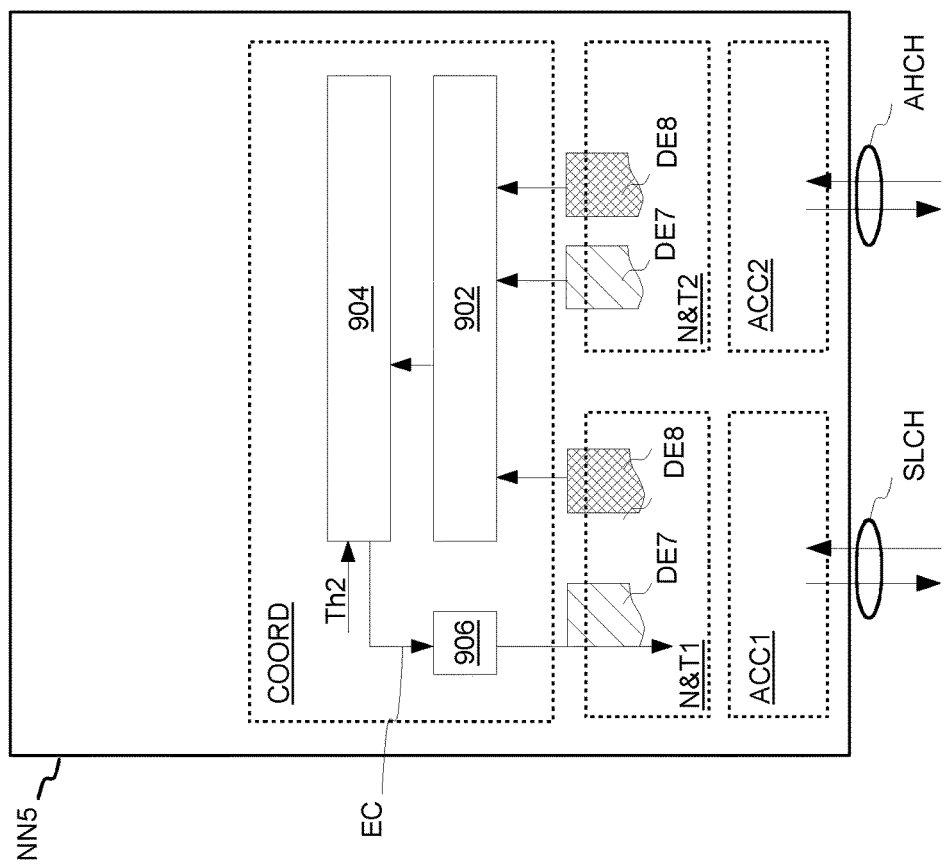
Fig. 13

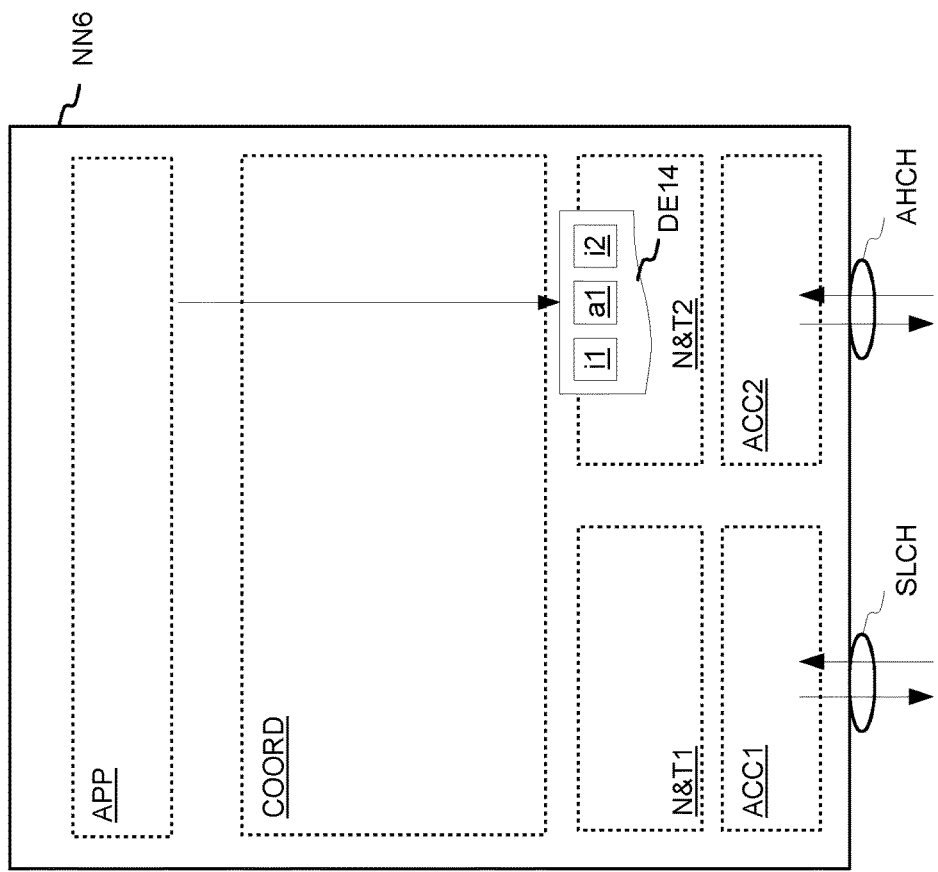
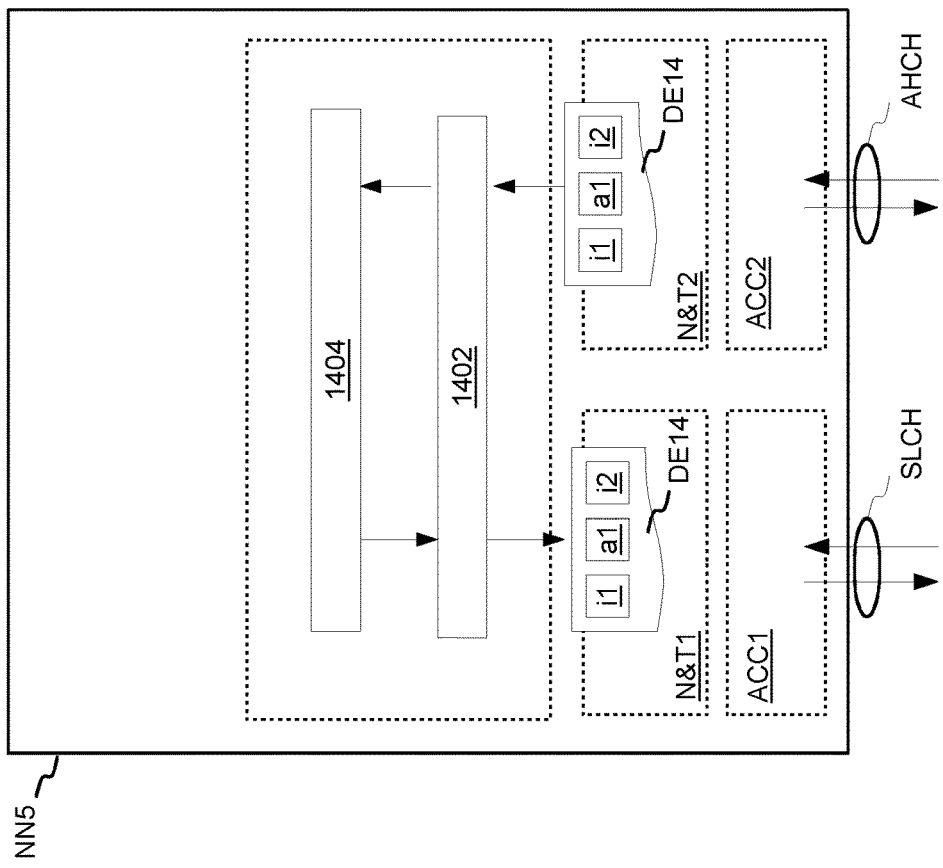
Fig. 14

ROAD-SIDE NETWORK NODE AND METHOD TO OPERATE THE ROAD-SIDE NETWORK NODE

FIELD

The present invention is directed to a road-side network node and method to operate the road-side network node.

BACKGROUND INFORMATION

State-of-the-art vehicles are able to exchange information with other vehicles in their vicinity (V2V: Vehicle to Vehicle). Also, vehicles with roadside infrastructure can communicate wirelessly (V2I: Vehicle to Infrastructure). Likewise, the vehicle can communicate wirelessly with a backend server in the Internet (V2N: Vehicle to Network) or with a pedestrian terminal (V2P: Vehicle to Person). Overall, this communication is referred to as Vehicle-to-Everything (V2X).

The development of new functions and services in the automotive industry such as automated driving benefits from V2X. Road safety, ride comfort and energy efficiency can be improved. This leads to new products and business models for automakers, automotive suppliers and other service providers.

The first generation of V2X applications to be deployed in the coming years is primarily related to road application. Their goal is to provide the driver with information about the road environment. Vehicles periodically provide status information (e.g., position, speed, acceleration, etc.) and/or event information (rescue mission, vehicle stagnant, traffic jam). This information is usually issued locally in the form of text messages. From neighboring vehicles, this event-based information can be sent to a central network unit (base station, backend).

SUMMARY

An example road-side network node and an example method to operate the road-side network node are provided in accordance with the present invention.

According to a first aspect of the present invention, an example road-side network node is provided, the road-side network node comprising a processor, a memory, a first radio module for operating in a cell-supported radio communications network, a second radio module for operating in an adhoc radio communications network, and at least one antenna. The road-side network node is configured to: discover at least one further road-side network node in the vicinity of the road-side network node as a gateway node, wherein the at least one further road-side node has the capability to exchange data across the cell-supported radio communications network and the adhoc radio communications network; and exchange data across the cell-supported radio communications network and the adhoc radio communications network in dependence on the discovered at least one further road-side network node.

Advantageously the exchange of data across the radio networks is done in a cooperated manner as the discovered further road-side network nodes interact by discovering each other. The discovering provides that each network node knows about the potential exchange ratio which is established by the gateway-capable road-side network nodes.

According to an advantageous embodiment of the present invention, the road-side network node is configured to receive a first data entity from the further road-side network node via a sidelink channel of the cell-supported radio communications network; receive a second data entity from the further road-side network node via an adhoc channel of the adhoc radio communications network; determine a similarity value in dependence on the first and second data entity; discover the at least one further road-side network node as being a gateway node when the similarity value is above a threshold.

The similarity comparison advantageously provides the discovery of the gateway-capable nodes without further protocol overhead.

According to an advantageous embodiment of the present invention, the road-side network node is configured to receive a third data entity comprising a first indication that the transmitting road-side network node is a gateway node.

Advantageously, the first indication provides a simple protocol-like indication which does not incur processing overhead on the receiving side.

According to an advantageous embodiment of the present invention, the road-side network node is configured to receive the third data entity comprising a second indication that the transmitting road-side network node has transmitted the contents of the third data entity on the sidelink radio channel and the adhoc radio channel.

The second indication provides the information that the contents has already been replicated in the other network. So, the network node receiving the second indication may advantageously refrain from replicating the message in the other radio communications network. Advantageously, unnecessary traffic can be reduced.

According to an advantageous embodiment of the present invention, the road-side network node is configured to transmit the contents of the third data entity only via the sidelink channel when the third data has been received via the adhoc channel and the second indication is not true.

According to an advantageous embodiment of the present invention, the road-side network node is configured to transmit the contents of the third data entity only via the adhoc channel when the third data has been received via the sidelink channel and the second indication is not true.

According to an advantageous embodiment of the present invention, the road-side network node is configured to determine a number of further road-side network nodes operating as a gateway; exchange data across the cell-supported radio communications network and the adhoc radio communications network in inverse proportion to the number of further road-side network nodes operating as a gateway.

When no gateway nodes are in the vicinity the network node increases the exchange between both network types. When many gateway nodes appear in the vicinity, the network node reduces its exchange between both network types. Load balancing between the networks is provided.

According to a further aspect of the present invention, an example method to operate a road-side network node in a cell-supported radio communications network and in an adhoc radio communications network is provided. The method comprises: discovering at least one further road-side network node in the vicinity of the road-side network node as a gateway node, wherein the at least one further road-side node has the capability to exchange data across the cell-supported radio communications network and the adhoc radio communications network; and exchanging data across the cell-supported radio communications network and the adhoc radio communications network in dependence on the discovered at least one further road-side network node.

Further features and advantages of the present invention are described herein.

BRIEF DESCRIPTION OF THE DRAWINGS

FIG. 6 depicts schematically a flow chart.
FIG. 7 depicts schematically a flow chart.
FIG. 8 depicts schematically a flow chart.
FIG. 9 depicts schematically a reception coordination function.
FIG. 11 depicts schematically a flow chart.
FIG. 13 depicts schematically two interacting road-side network nodes.
FIG. 14 depicts schematically two interacting road-side network nodes.

DETAILED DESCRIPTION OF EXAMPLE EMBODIMENTS

Figure 1:
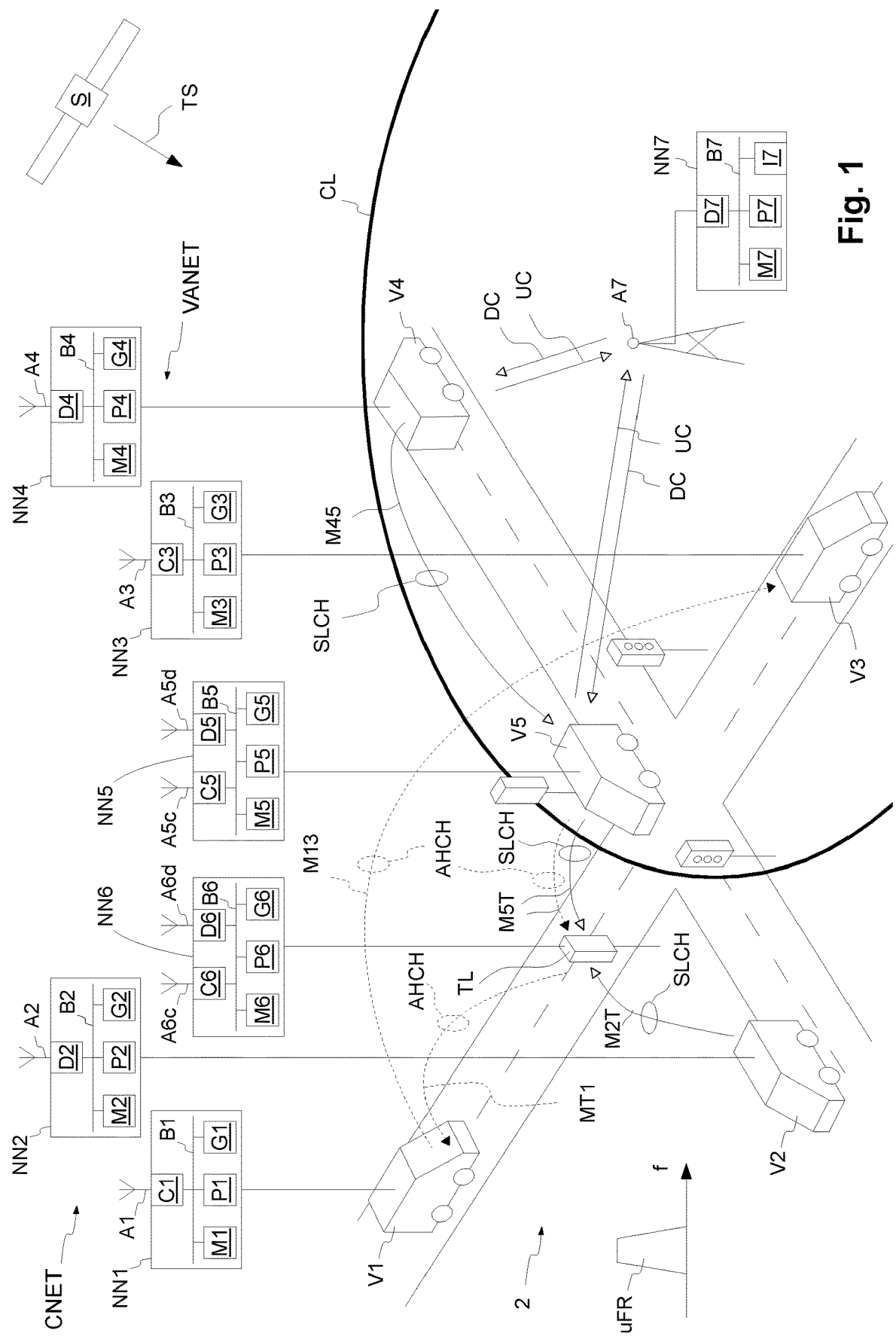
FIG. 1 depicts a schematic perspective view of an exemplary traffic situation.

FIG. 1 depicts a schematic perspective view of an exemplary traffic situation around a traffic lights crossing 2. Each vehicle V1, V3 comprises a network node NN1, NN3 forming an adhoc radio communications network VAN ET. Each vehicle V2, V4 comprises a network node NN2, NN4, which form a cell-supported radio communications network CNET. A vehicle V5 and a traffic light TL comprise a network node NN5, NN6, which are configured to participate in the adhoc radio communications network VANET and the cell-supported radio communications network CNET. Of course also other fixed infrastructure entities besides traffic lights may comprise a network node like NN1, NN2, or NN6.

Each one of network nodes NN1, NN2, NN3, NN4, NN5, NN6, and NN7 comprises a data bus B1, B2, B3, B4, B5, B6, and B7 interconnecting at least a processor P1, P2, P3, P4, P5, P6, and P7, a memory M1, M2, M3, M4, M5, M6, and M7, and a satellite receiver G1, G2, G3, G4, G5, G6, and G7. The network nodes NN1, NN2, NN3, NN4, NN5, NN6 are road-side network nodes, which means that these network nodes are installed in a vehicle or a road infrastructure. The network node NN7 is a network infrastructure node, which means that this node is configured to manage network functions. The satellite receiver G1, G2, G3, G4, G5, G6, and G7 is configured to receive at least one satellite Signal TS, for example a GPS, Global Positioning System, Signal, originating from an earth satellite S. On each of the memory M1, M2, M3, M4, M5, M6, and M7 a computer program is stored, which implements the methods disclosed in this description when executed on the corresponding processor P1, P2, P3, P4, P5, P6, and P7. Alternatively or additionally, the processors P1, P2, P3, P4, P5, P6, and P7 are implemented as ASIC. Each one of the network nodes NN1, NN3 comprises a radio module C1, C3 configured for the transmission and reception of radio signals according to the adhoc radio communications network VANET. Each one of the radio modules C1, C3 is connected to an antenna A1, A3.

Each one of the network nodes NN2, NN4 comprises a radio module D2, D4 configured for the transmission and reception of radio signals according to the cell-supported radio communications network CNET. Each one of the radio modules D2, D4 is connected to an antenna A2, A4. Each one of the network nodes NN5, NN6 comprises a radio module D5, D6 configured for the transmission and reception of radio signals according to the cell-supported radio communications network CNET, and a radio module C5, C5 configured for the transmission and reception of radio signals according to the adhoc radio communications network VANET. Each one of the radio modules D5, D6 is connected to an antenna A5d, A6d. Each one of the radio modules C5, C6 is connected to an antenna A5c, A6c.

National authorities such as the "Bundesnetzagentur" of the Federal Republic of Germany draw up a frequency usage plan which, for example, includes licenses for the different network operators. The network operator is allowed, under the assigned license, to connect the network infrastructure nodes and network nodes in an assigned licensed frequency range or frequency spectrum. In contrast, there are frequency ranges or frequency spectra which are not assigned to any network operator and can be freely used under certain boundary conditions such as, for example, dedicated transmission/reception power.

The network VAN ET provides an adhoc radio Channel AHCH. The network CNET provides the sidelink radio channel SLCH. Each one of the sidelink radio channel SLCH and the adhoc radio channel AHCH is an instance of wireless medium, WM, use for the purpose of passing physical layer, PHY, protocol data units, PDUs, between two or more network nodes. In both networks VANET and CNET radio signals are transmitted using the same or overlapping unlicensed frequency range uFR. Uncoordinated use of the channels SLCH and ARCH would lead to a deterioration of at least one of both channels SLCH and ARCH.

The network infrastructure node NN7 comprises a network interface 17 for accessing other network nodes for example of a backhaul network. The network infrastructure node NN7 can also be designated as a base station or eNodeB. The network infrastructure node NN7 is connected to a stationary antenna A7 to send data on a downlink channel DC and to receive data on an uplink channel UC. The antenna A7 comprises, for example, a number of antennas and is designed, for example, as a remote radio head, RRH. Of course, the network infrastructure node NN7 can be realized in a distributed manner, for example in the context of a virtualization, and may consist of a plurality of separated network nodes. The network infrastructure node NN7 and the roadside network nodes NN2, NN4, NN5 and NN6 are configured according to the LTE-V2X standard, for example.

The network infrastructure node NN7 and the antenna A7 provide a radio CL within which the roadside network nodes NN5 and NN4 are in-coverage and are able to communicate with the network infrastructure node NN7. On the other hand, the network nodes NN2 and NN5 do not reside within the radio CL, are out-of-coverage with regard to the network infrastructure node NN7 and are not able to communicate directly with the network infrastructure node NN7.

The sidelink radio channel SLCH and a sidelink in general are defined, for example, by document 3GPP TS 36.300 V14.2.0 (2017-03), which is incorporated herein by reference. The network nodes NN2, NN4, NN5 and NN6 are configured according to 3GPP TS 36.300 V14.2.0 (2017-03). The sidelink includes sidelink discovery, and V2X sidelink communication. The sidelink uses uplink resources and a physical channel structure similar to the uplink. The sidelink thus differs from the uplink with respect to the physical channel.

The sidelink is limited to individual cluster transmission for the sidelink physical channels. Furthermore, the sidelink uses a 1-symbol gap at the end of each sidelink subframe. For V2X sidelink communication, PSCCH, Physical Sidelink Control Channel, and PSSCH, Physical Sidelink Shared Channel, are transmitted in the same subframe.

Physical layer processing of transport channels in the sidelink differs from uplink transmission in the following steps: Scrambling: For PSDCH, Physical Sidelink Discovery Channel, and PSCCH, scrambling is not specific to the network entity; Modulation: 64 QAM and 256 QAM are not supported for the Sidelink (QAM: Quadrature amplitude modulation). The PSCCH indicates sidelink resources and other transmission parameters used by the respective network node for the PSSCH.

For PSDCH, PSCCH and PSSCH demodulation, reference signals similar to the uplink demodulation reference signals in the 4th symbol of the slot are transmitted in the normal CP, Cyclic Prefix, and in the third symbol of the slot in the extended CP. The sidelink demodulation reference signal sequence length corresponds to the size (number of subcarriers) of the associated resource. For V2X sidelink communication, reference signals are transmitted in the 3rd and 6th symbols of the first slot and in the 2nd and 5th symbols of the second slot in the CP. For PSDCH and PSCCH, reference signals are generated based on a fixed base sequence, cyclic shift and orthogonal cover code. For V2X sidelink communication, the cyclic shift for PSCCH is randomly selected on each transmission.

For measurements of the sidelink radio channel, the following options are available on the side of the network nodes: Receiving power of the sidelink reference signal (S-RSRP); Receive power of the sidelink discovery reference signal (SD-RSRP); Received power of the PSSCH reference signal (PSSCH-RSRP); Signal strength indicator for Sidelink reference signals (S-RSSI).

A sidelink resource pool can be provided pre-configured, semi-static, or dynamically and corresponds to a set of radio resources capable of performing a sidelink transmission via the sidelink radio channel SLCH. A network node performing sidelink communication in a mode 2 (uncovered case) autonomously selects a resource from a resource pool range, which is configured by the network infrastructure node NN7 or a headend of a sidelink cluster in advance. A network node performing sidelink communication in a mode 1 (covered case) selects a resource which has been scheduled by the network infrastructure node NN7.

Each one of network nodes NN1, NN3, NN5, NN6 is configured, for example, according to the IEEE 802.11p standard, especially IEEE 802.11p-2010 dated Jul. 15, 2010 which is incorporated by reference. The IEEE 802.11p PHY and MAC provide services for upper layer protocols for Dedicated Short-Range Communications, DSRC, in the US and for Cooperative US, C-ITS, in Europe. The network nodes NN1, NN3, NN5, NN6 communicate directly with each other via an adhoc radio channel AHCH in the unlicensed frequency range. The adhoc radio channel AHCH is arbitrated via a CSMA/CA (Carrier Sense Multiple Access/Collision Avoidance) protocol by radio modules C1, C3, C5, C6.

The network node NN1 is configured to transmit data via the adhoc radio channel ARCH and the network node NN3 can receive the data. All network nodes in the reception range of the radio signal as for example the network node NN3 are able to receive such data. The adhoc radio channel AHCH and an adhoc radio channel in general and the adhoc wireless communication network VANET are described, for example, by the IEEE Standard "802.11p-2010—IEEE Standard for Information Technology—Local and Metropolitan Area Networks—" Specific Part 11: Wireless LAN Medium Access Control (MAC) and Physical Layer (PHY) Specifications Amendment 6: Wireless Access in Vehicular Environments, which is incorporated herein by reference. IEEE 802.11p is a standard for extending the WLAN Standard IEEE 802.11. The goal of IEEE 802.11p is to establish wireless technology in passenger vehicles and to provide a reliable interface for Intelligent Transport Systems (ITS) applications. IEEE 802.11p is also the basis for Dedicated Short Range Communication (DSRC) in the 5.85 to 5.925 GHz band. To avoid confusion with the European DSRC Version, the term ITS-G5 is used rather than DSRC, especially in Europe.

To access the adhoc radio channel ARCH the network node NN1, NN3, NN5 and NN6 use an enhanced distributed channel access, EDCA, and a listen-before-talk, LBT, procedure. The LBT comprises a backoff procedure prior to transmitting on the adhoc radio channel ARCH. First the network node NN1, NN3, NN5 or NN6 listens and waits until the adhoc radio channel ARCH is available during a period of time, the period of time AIFS being termed as arbitration inter-frame space AIFS. The adhoc radio channel ARCH is sensed idle if a power level is lower than a first threshold value like 62 dBm and no adhoc preamble with a power level higher than a second threshold value like −82 dBm is determined. The adhoc radio channel is busy if the channel is not sensed idle.

If the adhoc radio channel AHCH is sensed idle during the period of time AIFS, the backoff procedure starts. A backoff timer is initialized as a random number being multiples of a 9 µs slot time. The random number is determined within a contention window. The random backoff timer is decreased by one when the adhoc radio channel AHCH is sensed idle. For each slot time the adhoc radio channel AHCH is sensed busy the random backoff timer remains with the same value as before.

The network node NN1, NN3, NN5 or NN6 obtains a transmission opportunity TXOP if the backoff timer expires. If the network node NN1, NN3, NN5 or NN6 senses the adhoc radio channel as idle, it will transmit the data, if a transmission opportunity TXOP duration has not expired.

The receiving network node among the network nodes NN1, NN3, NN5, and NN6 will send an acknowledgment to the sending node upon reception of the data if the data was not transmitted in a broadcast mode.

The document "ETSI EN 302 663 V1.2.0 (2012-11)", which is incorporated herein by reference, describes both lowermost layers of ITS-G5 technology (US G5: Intelligent Transport Systems operating in the 5 GHz frequency band), the physical layer and the data link layer. The radio modules C1, C3, C5, and C6 realize, for example, these two lowest layers and corresponding functions according to "ETSI TS 102 687 V1.1.1 (2011-07)" in order to use the adhoc radio channel. The following unlicensed frequency bands are available in Europe for the use of the adhoc radio channel AHCH, which are part of the unlicensed frequency band NLFB: 1) ITS-G5A for safety-relevant applications in the frequency range 5,875 GHz to 5,905 GHz; 2) ITS-G5B for non-safety related applications in the frequency range 5,855 GHz to 5,875 GHz; and 3) ITS-G5D for the operation of ITS applications in the 5.055 GHz to 5.925 GHz frequency range. ITS-G5 allows communication between the two network units UE1 and UE2 out of the context of a base station. The ITS-G5 enables the immediate exchange of data frames and avoids the management overhead that is used when setting up a network.

The document "ETSI TS 102 687 V1.1.1 (2011-07)", which is incorporated herein by reference, describes for ITS-G5 a "Decentralized Congestion Control Mechanism". Among other things, the adhoc radio channel AHCH serves to exchange traffic safety and traffic efficiency data. The radio modules C1, C3, C5, and C6 realize, for example, the functions as described in the document "ETSI TS 102 687 V1.1.1 (2011-07)". The applications and services in the ITS-G5 are based on the cooperative behavior of the roadside network nodes that make up the adhoc network VAN ET (VAN ET: vehicular ad hoc network). The adhoc network VAN ET enables time-critical road traffic applications that require rapid information exchange to alert and assist the driver and/or vehicle in good time. To ensure proper functioning of the adhoc network VANET, "Decentralized Congestion Control Mechanisms" (DCC) is used for the adhoc radio channel AHCH of ITS-G5. DCC has features that reside on multiple layers of the ITS architecture. The DCC mechanisms are based on knowledge about the channel. The channel state information is obtained by channel probing. Channel state information can be obtained by the methods TPC (transmit power control), TRC (transmit rate control) and TDC (transmit datarate control). The methods determine the channel state information in response to received signal level thresholds or preamble information from detected packets.

The adhoc radio communications network VANET and the cell-supported radio communications network CNET differ in various aspects—Differences between both technologies are already present in the coding/decoding chain, therefore in modulation and coding schemes. This does not allow a successful decoding of a received signal of the other technology. Different reference symbols are used in a different way: sidelink reference symbols are transmitted at certain radio resources during a transmission via the sidelink radio channel SLCH. On the other hand, adhoc reference symbols are transmitted at the beginning of a transmission via the adhoc radio channel AHCH. Moreover, the transmission via the sidelink radio channel SLCH requires that the participating network nodes are synchronized in time in order to correctly decode the received signal. The adhoc radio channel on the other hand allows connectionless, unsynchronized transmission of signals.

In the shown traffic situation the network nodes NN1 to NN6 are located such, that the radio power of each network nodes NN1 to NN6 is sufficient to reach another one of the network nodes NN1 to NN6. Thus, transmissions on the channels AHCH and SLCH which overlap in frequency can adversely affect each other. One aim of this description is to reduce this disadvantageous mutual influence.

For example, the vehicle V5 is an emergency vehicle in emergency operation and communicates its emergency status in a message M5T via the adhoc radio channel ADCH and the sidelink radio channel to the traffic light TL. The network node NN5 is configured to transmit a message via the sidelink radio channel SLCH and/or via the adhoc radio channel AHCH, which can be received by the network node NN6. As both network nodes NN5 and NN6 comprise the radio modules C5, D5, C6, D6 for both networks CNET and VANT, the access to both technologies is possible. The network nodes NN5 and NN6 can also be termed gateway nodes. The sidelink radio channel SLCH between the network nodes NN5 and NN6 is operated in the distributed mode.

In dependence of the received message the traffic light TL closes the crossing for cross traffic. Upon switching to red the traffic light communicates its red-light status in a message MT1 via the adhoc radio channel AHCH to the vehicle V1 in order to reduce its speed. The vehicle V1 moves with a speed of 100 km/h and communicates the speed in a message M13 via the adhoc radio channel ADCH to the other vehicle, e.g., vehicle V3.

The network node NN2 is configured to transmit a message M2T via the sidelink radio channel SLCH to the network node NN6. As both network nodes NN2 and NN6 reside outside the radio cell CL, the access to the sidelink radio channel SLCH is not controlled by a network infrastructure node. The sidelink radio channel SLCH between the network nodes NN2 and NN6 is operated in the distributed mode.

The network node NN4 is configured to transmit a message M45 via the sidelink radio channel SLCH to the network node NN5. As both network nodes NN4 and NN5 reside in the radio cell CL, the access to the sidelink radio channel is controlled by the network infrastructure node NN7. The sidelink radio channel SLCH between the network nodes NN4 and NN5 is operated in mode 1 or managed mode, which means that the network infrastructure node NN7 controls the transmission on the sidelink radio channel SLCH via corresponding scheduling assignments SA in the downlink channel DC. The network infrastructure node NN7 comprises a scheduler which determines the scheduling assignments SA for the sidelink radio channel SLCH. The scheduling assignments SA are control signals transmitted via the downlink channel DC and indicate which sidelink radio resource are to be used by the network nodes NN4, NN5 to transmit the data via the sidelink. The scheduling assignments SA are determined in such a way that collisions are avoided and interference is minimized. This is of great importance under high network load, as the scheduler entity is able to guarantee a Quality-of-Service (QoS), e.g., data rate, data reliability, packet error ratio, or delay, to different applications by allocating sidelink radio resources to each network node NN4, NN5 based on the service quality requirements of the application. The data transmissions associated with the scheduling assignments SA can occupy adjacent resource blocks RB in the same sub-frame or non-adjacent RBs depending on the latency required by the application. The scheduling and the control by the network infrastructure node NN7 can only be performed in areas where the signals of the node NN7 are available (in-coverage). In this mode the scheduling and interference management of radio traffic is assisted by the network infrastructure node NN7 via control signaling over the downlink channel DC. The network infrastructure node NN7 assigns for each network node the resources (ea. time and frequency ranges) to be used for the sidelink in a dynamic manner.

Since services should be available everywhere including areas where no network coverage by a network infrastructure node NN7 is available, there is a further configuration or deployment mode for the sidelink radio channel SLCH, namely the distributed mode. In the distributed mode the scheduling and interference management of radio traffic is supported based on distributed algorithms implemented between the network nodes, for example NN2 and NN5. These distributed algorithms are based on sensing with semi-persistent transmission based on the fact that the radio traffic generated by each network node NN2, NN5 is mostly periodic in nature. This technique enables sensing the occupation of a radio resource and estimate the future congestion on it. This optimizes the use of the sidelink by enhancing resource separation between transmitters that are using overlapping resources. Additionally, a mechanism where resource allocation is dependent on geographical information is able to reduce the number of network nodes competing for the same resources which reduces the collision probability. The distributed mode is mainly used in out-of-coverage scenarios and designated also as non-cell-supported mode. Consequently, the cell-supported communications network CNET provides the cell-supported mode (in-coverage) and the distributed mode (out-of-coverage). Even out-of-coverage the network CNET is termed cell-assisted radio communications network.

Both modes are defined to use a dedicated carrier for radio communications, meaning the spectrum band is only used for the direct side-link based V2V communications. The design is scalable for different bandwidths (e.g., 10 MHz or multitudes of 10 MHz). For time synchronization GNSS, Global Navigation Satellite System, is used in both cases.

In this description, reference is made to a single uplink channel and a single downlink channel. For example, the uplink channel and the downlink channel include respective subchannels. Several channels can be used in the uplink as well as in the downlink. The same applies to the sidelink radio channel SLCH and the adhoc radio channel AHCH.

Figure 2A:
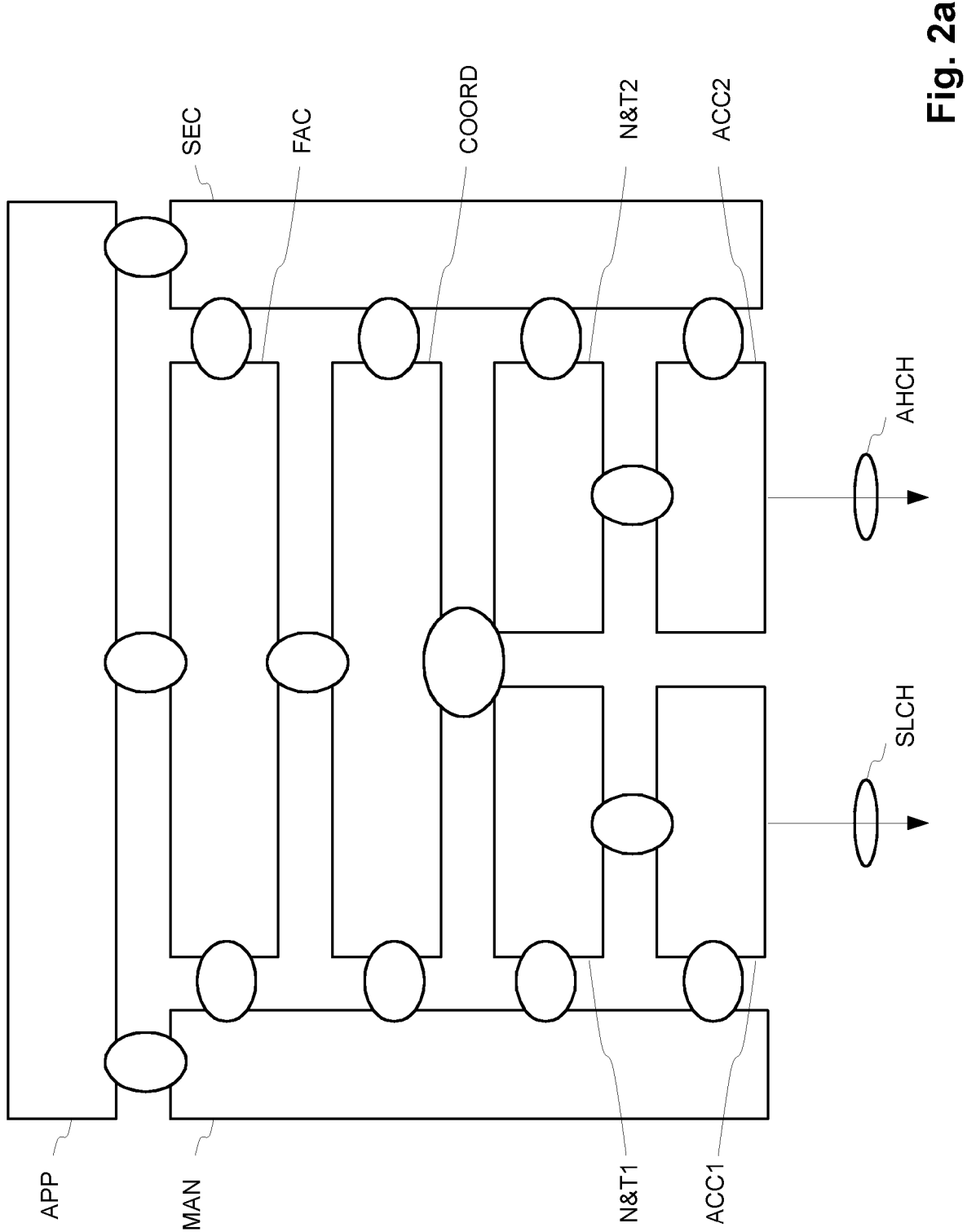
FIG. 2a depicts schematically a layer structure.

FIG. 2a shows schematically a layer structure for a gateway network node such as the network nodes NN5 and NN6 of FIG. 1. The protocol stack of the gateway network node basically follows the ISO/OSI reference model and comprises horizontal protocol layers and two vertical protocol entities. The horizontal protocol layers comprise: At least two access technology layers ACC1 and ACC2 for the physical and data link layers, at least two network & transport layers N&T1 and N&T2, one coordination layer COORD, a facilities layer FAC, and an applications layer APP. Further network & transport layers comprise protocols for data delivery to and from the gateway node to other network nodes, such as network nodes in the core network (e.g., the Internet)

The access technology layer ACC1 comprises an access scheme for the LTE physical layer, based on Orthogonal Frequency Division Multiplexing (OFDM) with a cyclic prefix (CP) in the downlink, and on Single-Carrier Frequency Division Multiple Access (SC-FDMA) with a cyclic prefix in the uplink and sidelink. To support transmission in paired and unpaired spectrum, two duplex modes are supported: Frequency Division Duplex (FDD), supporting full duplex and half duplex Operation, and Time Division Duplex (TDD). The physical layer specification of the access technology layer ACC1 consists of the documents 3GPP TS 36.201, TS 36.211, TS 36.212, TS 36.213, TS 36.214 and TS 36.216, which are incorporated by reference. The physical layer of the access technology layer ACC1 is defined in a bandwidth agnostic way based on resource blocks, allowing the LTE Layer 1 to adapt to various spectrum allocations. A resource block spans either 12 sub-carriers with a sub-carrier bandwidth of 15 kHz or 24 sub-carriers with a sub-carrier bandwidth of 7.5 kHz each over a Slot duration of 0.5 ms, or 144 sub-carriers with a sub-carrier bandwidth of 1.25 kHz over a slot duration of 1 ms. Narrowband operation is also defined, whereby certain UEs may operate using a maximum transmission and reception bandwidth of 6 contiguous resource blocks within the total system bandwidth. For Narrowband Internet of Things (NB-IoT) Operation, a network node operates in the downlink using 12 sub-carriers with a sub-carrier bandwidth of 15 kHz, and in the uplink using a single sub-carrier with a sub-carrier bandwidth of either 3.75 kHz or 15 kHz or alternatively 3, 6 or 12 sub-carriers with a sub-carrier bandwidth of 15 kHz. NB-IoT does not support TDD operation in this release. The radio frame structure type 1 is only applicable to FDD (for both full duplex and half duplex operation) and has a duration of 10 ms and consists of 20 slots with a slot duration of 0.5 ms.

Two adjacent slots form one sub-frame of length 1 ms, except when the sub-carrier bandwidth is 1.25 kHz, in which case one slot forms one sub-frame. The radio frame structure type 2 is only applicable to TDD and consists of two half-frames with a duration of 5 ms each and containing each either 10 slots of length 0.5 ms, or 8 slots of length 0.5 ms and three special fields (DwPTS, GP and UpPTS) which have configurable individual lengths and a total length of 1 ms. A subframe consists of two adjacent slots, except for subframes which consist of DwPTS, GP and UpPTS, namely subframe 1 and, in some configurations, subframe 6. Both 5 ms and 10 ms downlink-to-uplink switch-point periodicity are supported. Adaptation of the uplink-downlink subframe configuration via Layer 1 signaling is supported. Sidelink transmissions via the sidelink radio channel are defined for ProSe, Proximity Services, Direct Discovery and ProSe Direct Communication between network nodes. The sidelink transmissions use the, same frame structure as uplink and downlink when the network nodes are in network coverage; however, the sidelink transmissions are restricted to a sub-set of the uplink resources. V2X communication between network nodes is supported via sidelink transmissions or via the network infrastructure node.

Layer 2 of the access technology layer ACC1 is split into the following sublayers: Medium Access Control (MAC), Radio Link Control (RLC) and Packet Data Convergence Protocol (PDCP). The multiplexing of several logical channels (i.e., radio bearers) on the same transport channel (i.e., transport block) is performed by the MAC sublayer. In both uplink and downlink, when neither CA nor DC are configured, only one transport block is generated per TTI in the absence of spatial multiplexing. In Sidelink, only one transport block is generated per TTI. The layer 2 specification of the access technology layer ACC1 consists of the document 3GPP TS 36.300 V14.2.0 (2017-03), which is incorporated by reference.

The network and transport layer N&T 1 is used for the transmission and reception of messages. The network and transport layer N&T 1 is configured according to the document 3GPP TS 23.285 V14.2.0 (2017-03), which is incorporated by reference. The message transmission and reception is done via unicast and/or via Multimedia Broadcast Multicast Services, MBMS. The V2X communication via unicast over the LTE-Uu reference point supports roaming operations. The network and transport layer N&T2 supports the transport of IP based messages over UDP/IP packets. UDP is selected since it has shorter latency due to no connection setup, and since IP multicast works with UDP only. The network node sends a V2X message over UDP/IP to a V2X Application Server address. The V2X Application Server receives the V2X message in a UDP/IP packet on a V2X Application Server address.

The access technology layer ACC2 provides access to the adhoc radio channel according to IEEE Std 802.11p™-2010: Wireless Access in Vehicular Environments (Amendment 6)

and IEEE Std 802.11™-2016: Part 11: Wireless LAN Medium Access Control (MAC) and Physical Layer (PHY) Specifications.

The layer N&T2 is an ITS network & transport layer and comprises protocols for data delivery among network nodes of the adhoc radio communications network. ITS network protocols particularly include the routing of data from source to destination through intermediate adhoc-capable nodes and the efficient dissemination of data in geographical areas. ITS transport protocols provide the end-to-end delivery of data and, depending on requirements of ITS facilities and applications, additional services, such as reliable data transfer, flow control and congestion avoidance. A particular protocol in the ITS network & transport layer is the Internet protocol IP version 6 (IPv6). The usage of IPv6 includes the transmission of IPv6 packets over ITS network protocols, dynamic selection of ITS access technologies and handover between them, as well as interoperability issues of IPv6 and IPv4. The ITS network & transport layer comprises several network and transport protocols. In detail the gateway network node can execute a GeoNetworking protocol, Transport protocols over GeoNetworking, such as the Basic Transport Protocol and other GeoNetworking transport protocols, Internet protocol IP version 6 with IP mobility support and optionally support for network mobility, Internet protocol IP version 4 for transition to IPv6, User Datagram Protocol UDP, Transmission Control Protocols TCP, other network protocols such as SCTP.

The facilities layer FAC provides a collection of functions to support applications. The facilities provide data structures to store, aggregate and maintain data of different type and source (such as from vehicle sensors and from data received by means of communication). As for communication, facilities enable various types of addressing to applications, provide message handling and support establishment and maintenance of communication sessions. An important facility is the management of services, including discovery and download of services as software modules and their management in the network node. Furthermore, the facility layer FAC provides and manages local dynamic maps, which indicate the position and status of vehicles in the vicinity.

The applications layer APP refers to applications and use cases for road safety, traffic efficiency, infotainment and business.

The management entity MAN is responsible for configuration of a network node, cross-layer information exchange among the different layers and others tasks. The security entity SEC provides security and privacy services, including secure messages at different layers of the communication stack, management of identities and security credentials, and aspects for secure platforms (firewalls, security gateway, and tamper-proof hardware).

The coordination layer COORD allows a coordination of both radio technologies provided. For example, for usage of the GeoNetworking over different access technologies, the specification of the protocol is split into a media-independent part, namely the coordination layer COORD and a media-dependent part, namely the access technology layer ACC1 and the network & transport layer N&T 1 on the one side and access technology layer ACC2 and the network & transport layer N&T2 on the other side. GeoNetworking shall provide ad hoc networking based on geographical addressing and geographical routing between network nodes using short-range wireless technology. It shall allow the addressing of road-side network nodes based on their individual network addresses and also facilitate the addressing of geographical areas. For routing, GeoNetworking shall support point-to-point and point-to-multipoint communication, as well as the distribution of data packets in geographical areas, i.e., to all nodes in a geographical area (GeoBroadcast) or to any node in a geographical area (GeoAnycast).

The coordination layer COORD is configured to: exchange data with at least a second road-side network node via a sidelink radio channel of the cell-supported radio communications network; and exchange data with at least a third road-side network node via an adhoc radio channel of the adhoc radio communications network. The first access technology layer ACC1 is used for said exchange of data with at least the second road-side network node. So, the exchange of data with the second road-side network node is operated according to at least one of 3GPP TS 36.201, TS 36.211, TS 36.212, TS 36.213, TS 36.214 and TS 36.216. The second access technology layer ACC2 is used for said exchange of data with at least the third road-side network node. So, the exchange of data with at least the third road-side network node is operated according to IEEE 802.11p-2010 and/or ETSI EN 302 663 V1.2.0 (2012-11).

Figure 2B:
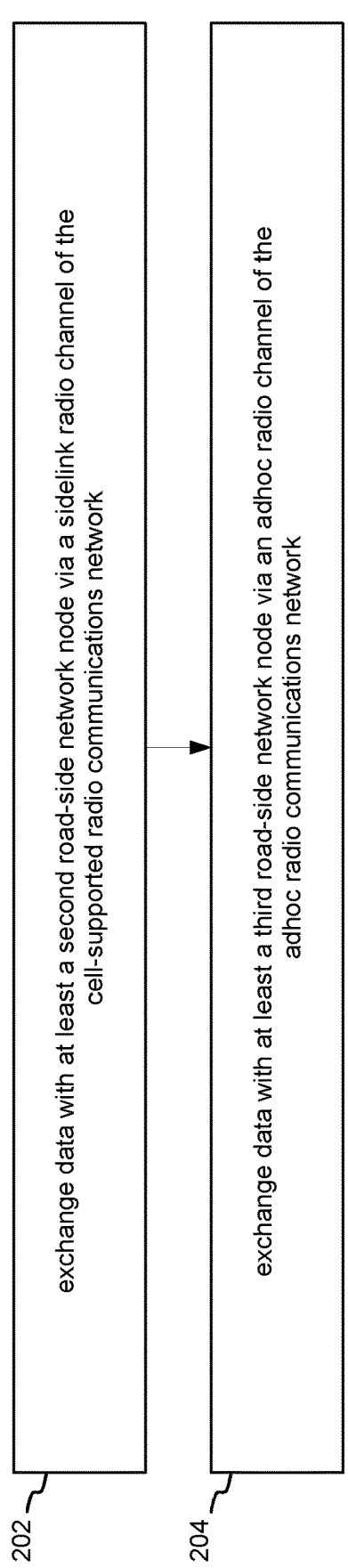
FIG. 2b depicts schematically a flow chart.

FIG. 2b depicts a flow chart for operating one of the network nodes NN5, NN6. Data is exchanged in a step 202 with at least a second road-side network node via a sidelink radio channel of the cell-supported radio communications network.

Data is exchanged in a step 204 with at least a third road-side network node via an adhoc radio channel of the adhoc radio communications network.

Figure 3:
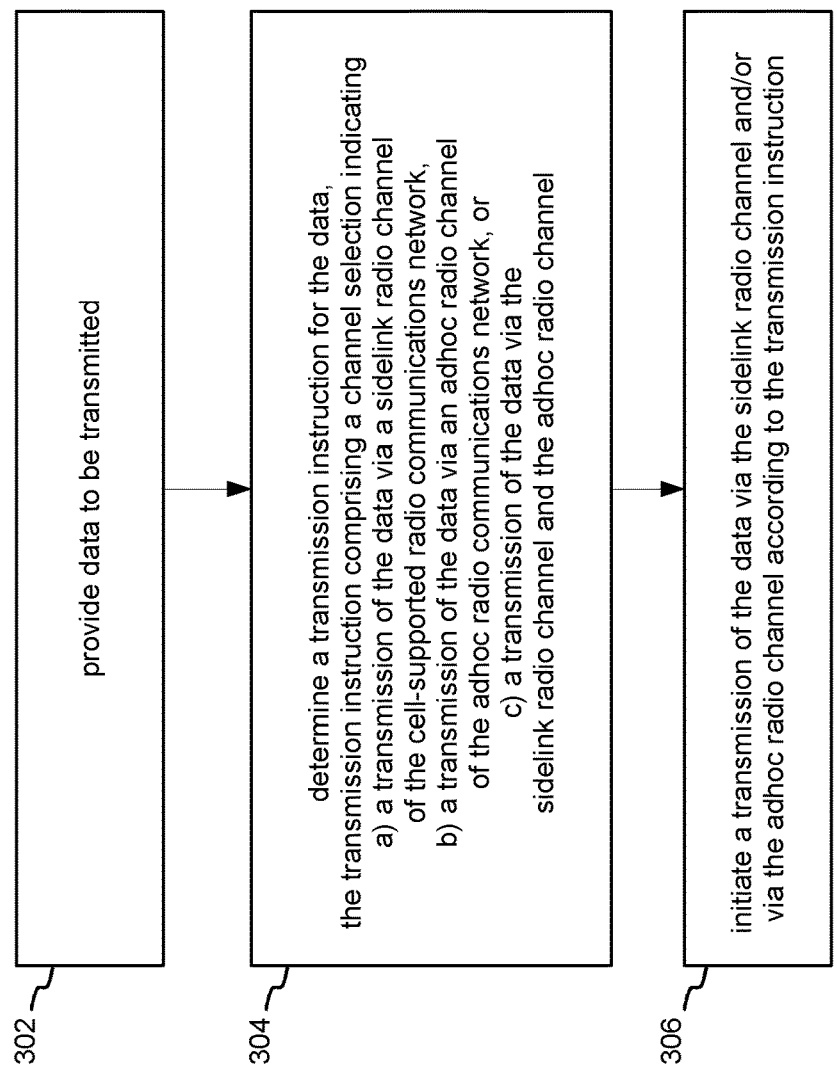
FIG. 3 depicts schematically a flow chart.

FIG. 3 depicts schematically a flow chart to operate a gateway network node such as the road-side network nodes NN5 and NN6 of FIG. 1. According to a step 302 data to be transmitted is provided by an upper layer, for example by an application function or by a facility function. According to a step 304 a transmission instruction for the data is determined. The transmission instruction comprises a channel selection indicating a) a transmission of the data via the sidelink radio channel of the cell-supported radio communications network, b) a transmission of the data via the adhoc radio channel of the adhoc radio communications network, or c) a transmission of the data via the sidelink radio channel and the adhoc radio channel. According to a step 306 a transmission of the data is initiated via the sidelink radio channel and/or via the adhoc radio channel according to the transmission instruction. Therefore, the gateway network node is configured to exchange data with at least a second road-side network node via a sidelink radio channel of the cell-supported radio communications network; and to exchange data with at least a third road-side network node via an adhoc radio channel of the adhoc radio communications network. According to channel selections a) and b) only one of both channels is selected.

Figure 4:
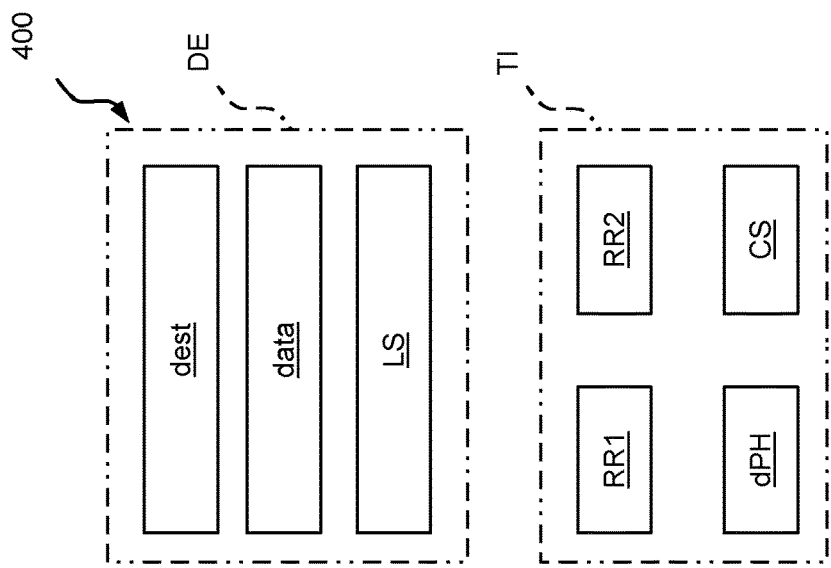
FIG. 4 depicts schematically a data structure.

FIG. 4 depicts schematically a data structure 400. The data structure 400 comprises a data entity DE with a destination address dest, data, which is transmitted via the sidelink radio channel and/or the adhoc radio channel, and a lifespan LS of the data. The destination address dest refers to a geographical area or a single network node. The data structure 400 comprises a transmission instruction TI. The transmission instruction comprises a first repetition rate RR1 for initiating transmissions via the sidelink radio channel, a second repetition rate RR2 for initiating transmissions via the adhoc radio channel, a phase difference dPH between the repetition rates RR1 and RR2, and the channel selection CS. The channel selection CS indicates a) the transmission of the data via the sidelink radio channel of the cell-supported radio Communications network, b) the transmission of the data via the adhoc radio channel of the adhoc radio communications network, or c) the transmission of the data via the sidelink radio channel and the adhoc radio channel. Depending on the data type a target repetition rate RR is pre-configured.

Figure 5:
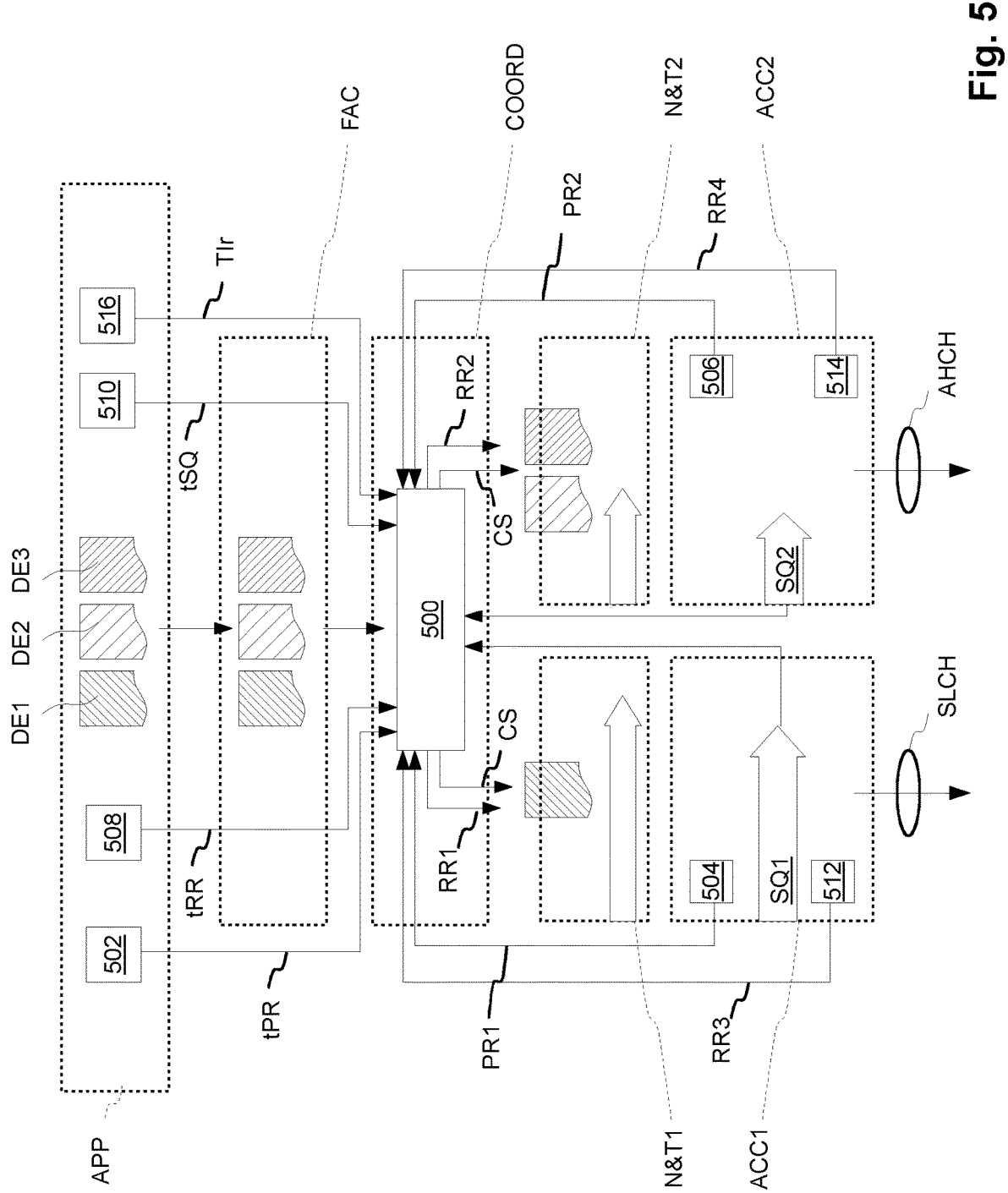
FIG. 5 depicts schematically a transmission coordination function.

FIG. 5 depicts schematically a transmission coordination function. Data entities DE1, DE2, and DE3 are provided by an application layer function to a coordination block 500. For each access technology a Service quality is determined. The first Service quality SQ1 of the sidelink radio channel and the second Service quality SQ2 of the adhoc radio channel are determined and provided to the block 500. The block 500 determines the channel selection CS to a), b) or c) in dependence on the first and second SQ1, SQ2. The Service quality SQ1, SQ2 comprises at least one of: packet loss, bit rate, throughput, transmission delay, availability, jitter, congestion level, or detected Quality of Service QoS.

For example, the block 500 determines the radio channel with a lower congestion in dependence on the first and second SQ1, SQ2 and determine the channel selection to a) or b) to transmit the data on the radio channel with the lower congestion value. The first and second SQ1 SQ2 are a) determined from channel measurements, b) derived from historic data, or c) determined as a prediction.

In yet another example, the block 500 increases one of the repetition rates RR1, RR2 for the radio channel with the lower congestion value. In order to accomplish this, the block 500 determines the first repetition rate RR1 of the transmission instruction in dependence on the first and second SQ1, SQ2, determines the second repetition rate RR2 of the transmission instruction in dependence on the first and second SQ1, SQ2. Then the block 500 reiteratively initiates the transmission of the data of data entity DE1 via the sidelink radio channel according to the first repetition rate RR1, and reiteratively initiates the transmission of the data of the data entity DE2 via the adhoc radio channel according to the second repetition rate RR2. If the first or second repetition rate RR1, RR2 is determined to zero, no transmission occurs via the sidelink or adhoc channel. For example, the block determines the radio channel with a higher congestion value in dependence on the first and second SQ1, SQ2 by comparing both SQ1 and SQ2 and decrease the repetition rate RR1, RR2 for the radio channel with the higher congestion value. Therefore, the block 500 coordinates a use of the first access technology layer ACC1 depending on a use of the second access technology layer ACC2. The block 500 coordinates a use of the second access technology layer ACC2 depending on a use of the first access technology layer ACC1. In summary, the block 500 performs a traffic flow control of data traffic across said first and second access technology layer ACC1, ACC2.

According to an embodiment, a block 510 determines a target service quality tSQ for data entity DE2. The target tSQ is for example a maximum congestion level of 3. The block 500 determines the channel selection to b) as SQ1 reveals congestion level of 6 and SQ2 reveals a congestion level of 2. The block 500 therefore determines the adhoc channel to transmit the data entity DE2 in dependence on the SQ1, SQ2 and tSQ.

The propagation range of data indicates an area, in which the data transmitted by the road-side network node will be received by other network nodes. The propagation range therefore also provides a second area, in which the data transmitted by the road-side network node will probably not be received by other network nodes.

A block 502 determines and provides a target propagation range tPR for the data of data entity DE1. A block 504 determines a first propagation range PR1 via the sidelink radio channel of, e.g., 1.5 km. A block 506 determines a second propagation range PR2 via the adhoc radio channel of, e.g., 1 km. The block 500 determines the channel selection CS to a) or b) in dependence on the target propagation range and in dependence on the first and second message propagation range. As the target propagation range tPR is, e.g., 2 km, the sidelink radio channel is selected exclusively for the transmission of the data of data entity DE1. In an example not shown, the target propagation range is, e.g., 0.5 km and the adhoc radio channel is selected exclusively for the transmission of data.

If the block 500 determines a high congestion of one of the sidelink radio channel and the adhoc radio channel. The block 500 overrides the determination of the channel selection CS in dependence on the target propagation if the high congestion is determined.

In an embodiment, the block 500 determines the transmission instruction to alternate a transmission initiation on the sidelink radio channel and the adhoc radio channel.

In an embodiment, the block 500 determines the first repetition rate RR1 for the sidelink channel and the second repetition rate RR2 for the adhoc channel in dependence on the target repetition rate tRP, which is determined and provided by a block 508. For example if the target repetition rate tRR is 10 Hz, the first and second repetition rates RR1, RR2 are determined to 5 Hz.

According to an embodiment, a number of road-side network nodes in the vicinity are determined. The block 500 reduces the repetition rate RR1, RR2 of the transmission instructions according to a) or b) if the determined number of road-side network nodes reaches a threshold in order to reduce traffic in the networks.

A block 512 determines a third repetition rate RR3 of data entities originating from at least one further road-side network node of the cell-supported radio communications network. The block 500 determines the first repetition rate RR1 in dependence on the third repetition rate RR3. For example, if a decreasing third repetition rate RR3 is sensed, the first repetition rate RR1 can be reduced as there are only few vehicles in the vicinity. The third repetition rate RR3 is a mean value and serves as a measure of channel congestion.

A block 514 determines a fourth repetition rate RR4 of data entities origination from at least one further road-side network node of the adhoc radio communications network. The block 500 determines the second repetition rate RR2 in dependence on the fourth repetition rate RR4. For example, if a decreasing fourth repetition rate RR4 is sensed, the second repetition rate RR2 can be reduced as there are only few vehicles in the vicinity. The fourth repetition rate RR4 is a mean value and serves as a measure of channel congestion. Preferably, each received data entity is assigned to a specific known vehicle/network node in the vicinity of the receiving network node, e.g., by anonymized vehicle/network node IDs. When measurements show that there is no network node with a certain technology in communication reach of the sending network node, sending of data on this technology could be skipped or reduced until new vehicles appear.

According to an embodiment, a block 516 provide a transmission instruction request Tlr which originates by a facility layer function or an application layer function. The block 500 determines the transmission instruction solely in dependence on the transmission instruction request Tlr, if the transmission instruction request Tlr is provided. Therefore, the transmission instruction request Tlr overrides every other function which determines the transmission instruction.

FIG. 6 depicts schematically a flow chart to operate one of the network nodes NN5, NN6 of FIG. 1. In a step 602 a similarity value is determined in dependence on a first data entity to be transmitted and second data entity, which has been transmitted. The similarity value reflects a similarity and therefore also a difference between both data entities. A transmission of the first data entity is initiated in step 604 if the similarity value exceeds a threshold. The similarity value is determined according to FIG. 9 or 10, for example. The threshold is provided to distinguish between a sufficient difference between the first and second data entities in order to justify a data transmission.

FIG. 7 depicts schematically a flowchart for operating one of the network nodes NN5, NN6 of FIG. 1. According to a step 702 data is received via the sidelink channel and/or the adhoc channel. According to a step 704 a danger level is determined in dependence on received data. According step 706 a minimum repetition rate is determined for at least one of the sidelink radio channel and the adhoc radio channel in dependence on the danger level. The repetition rate is maintained in a step 708 for at least one of the sidelink radio channel and the adhoc radio channel at or above the minimum repetition rate.

According to an embodiment, the minimum repetition rate for the sidelink channel is determined according to a pre-configured or received proportion of network nodes capable of using the sidelink radio channel. According to an embodiment, the minimum repetition rate for the adhoc channel is determined according to a pre-configured or received proportion of network nodes capable of using the adhoc radio channel.

According to an embodiment, the received data comprises a current speed and/or a current location of a distant vehicle. The danger level is determined in step 704 in dependence on the current speed and current location.

FIG. 8 depicts schematically a flow chart to operate one of the network nodes NN5 and NN6 of FIG. 1. According to a step 802 a plurality of first data entities are received via a sidelink radio channel of the cell-supported radio communications network. A plurality of second data entities are received in step 804 via an adhoc radio channel of the adhoc radio communications network. According to a step 806 a similarity value is determined for at least a pair of data entities from the plurality of first and second data entities. According to a step 808 the pair of data entities is provided in dependence on the similarity value. The similarity value reflects a similarity and therefore reflects also a difference between the pairwise compared data entities.

FIG. 9 depicts schematically a reception coordination function which is operated in one of the network nodes NN5, NN6 of FIG. 1. Data entities DE4, DE5 and DE6 are received via the adhoc channel ADHC. The data entity DE5 is also received via the sidelink channel SLCH. All received data entities DE3 to DE6 and the duplicate of DE5 are applied to a block 902. The block 902 determines a similarity value SV for each pair of the data entities DE4 to DE6 and the duplicate of DE5. A block 904 performs a threshold operation comparing the similarity value SV with at least one of the threshold values Th1 and Th2. The first threshold value Th1 is used for a threshold operation which determines whether to provide the respective data entity to a higher layer function.

A first data entity DE5 is received via the sidelink radio channel. A second data DE6 entity is received via the adhoc radio channel. The block 902 determines the similarity value SV in dependence on the first and second data entities DE5, DE6. The first and second data entity DE5, DE5 are provided in dependence on the similarity value. For example, the duplicate DE5 on the radio channels is determined by blocks 902 and 904 and only one instance of the data entity DE5 is provided to an application block 908. In yet another example, the blocks 902 and 904 determine no similar data entity for the data entity DE6, therefore providing the data entity 6 to a facility layer function 910. Therefore, data aggregation is performed across the first and second access technology layer ACC1, ACC2.

So, the data of data entity DE4 is received via the adhoc radio channel ADCH. An exchange criterion EC indicating whether the received data has to be injected into the adhoc radio channel or the sidelink channel is determined by block 904. The exchange criterion EC is determined if data entity DE4 has no similar partner in a pair, which is determined by the threshold operation using the threshold Th2 and if the data entity DE4 has a destination address other than that of the network node. A block 904 transmits the data entity DE4 via the sidelink radio channel in dependence on the exchange criterion.

According to an embodiment, the block 904 determines a high degree of similarity of two data entities, which are received in a subsequent order. The high degree of similarity indicates that the underlying data have undergone no change. So the provision of both of the data entities is rejected, if the similarity value indicates the high degree of similarity.

According to an embodiment, the block 904 selects the more recently received one of a pair of data entities, if the similarity value indicates a low degree of similarity, therefore indicating a change in data or that both data entities are completely different. Then, the block 904 provides the selected one of the data entities.

According to an embodiment, both data entities are provided, if the similarity value indicates a low degree of similarity.

Figure 10:
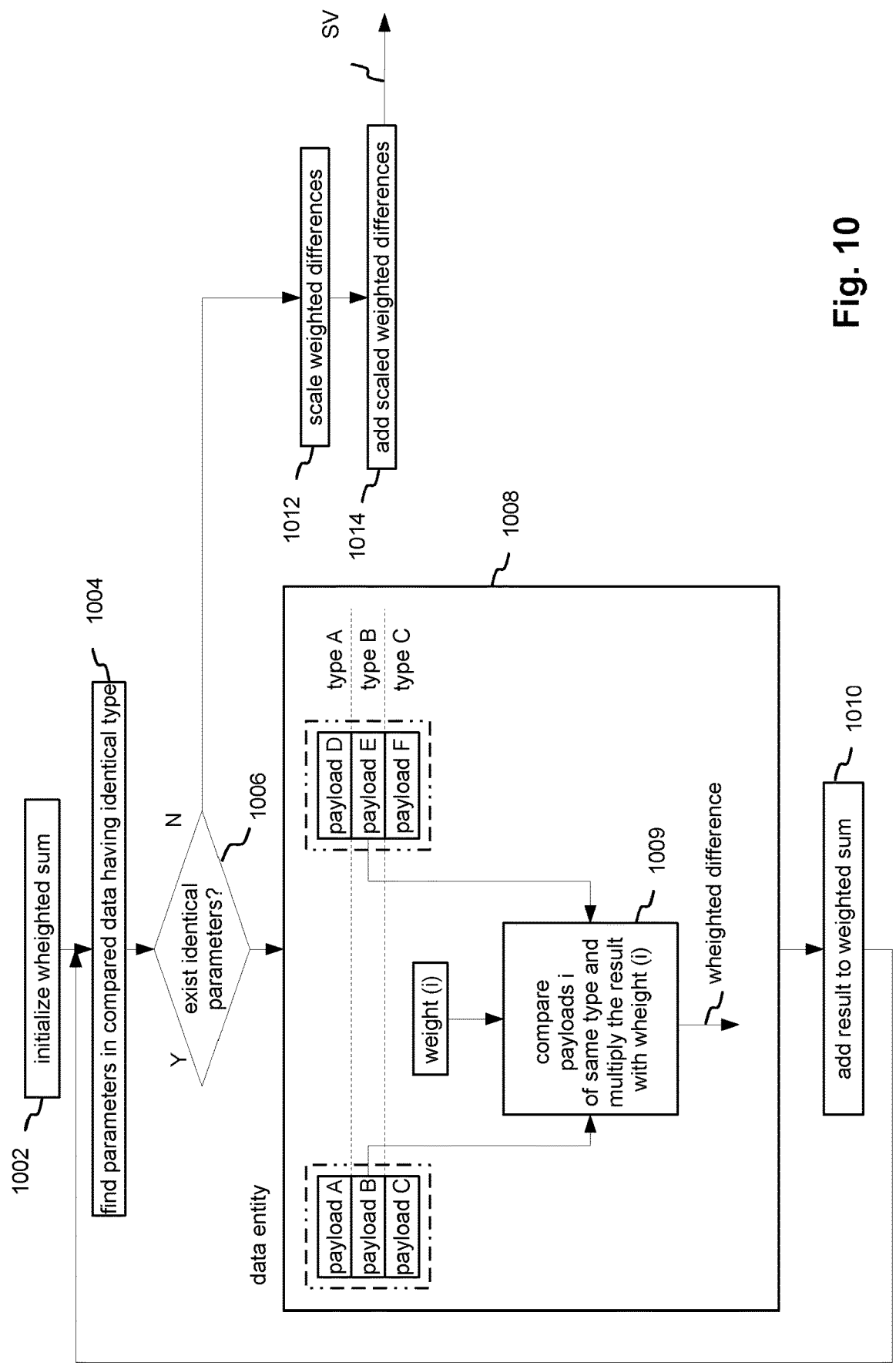
FIG. 10 depicts schematically a determination of a similarity value.

FIG. 10 depicts schematically a determination of the similarity value SV. According to a step 1002 a weighted sum is initialized to Zero. According to a step 1004 parameters with identical type are searched for in the pair of data entities. If identical parameters exist, a step 1006 will proceed to a step 1008. The step 1008 provides a comparison of payloads of the same type, for example payload B and payload E. A step 1009 provides a comparison of the payloads of the same type which can be a correlation. The determined correlation value is multiplied with a corresponding weight. In a step 1010 the weighted difference which is the result of step 1009 is added to the weighted sum. If no further identical parameters exist for the pair of data entities, the weighted differences are scaled or standardized in step 1012. A step 1014 sums up the weighted differences to the similarity value SV.

FIG. 11 depicts schematically a flow chart to operate one of the network nodes NN5, NN6. A list comprising further road-side network nodes in the vicinity of the road-side network node is determined according to a step 1102. A node-individual plurality of data entities from the plurality of first and second data entities which originate from one of the further road-side network nodes of the list is determined in a step 1104. The similarity value for at least a pair of data entities from the node-individual plurality of data entities is determined according to a step 1106.

Figure 12:
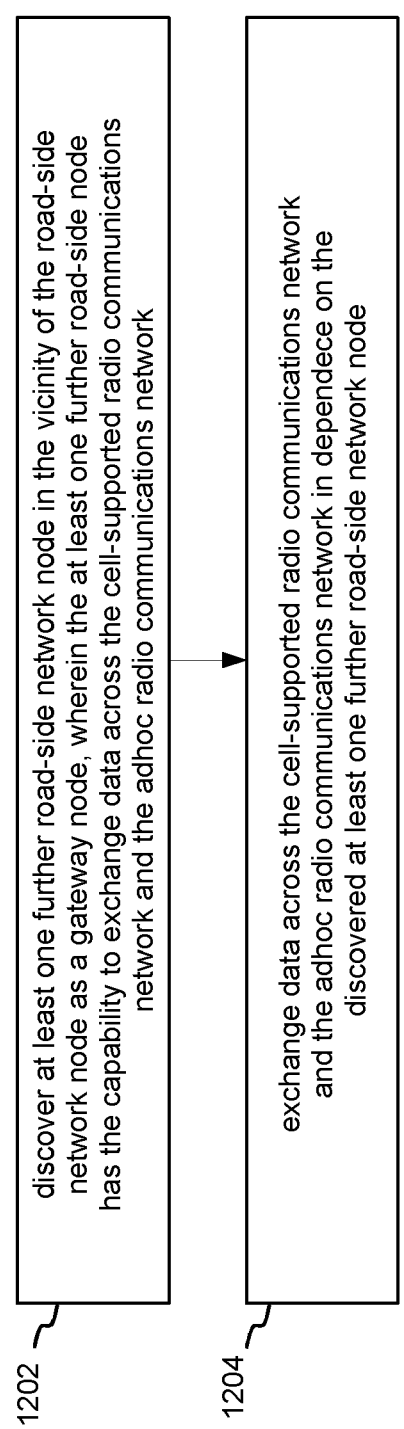
FIG. 12 depicts schematically a flow chart.

FIG. 12 depicts schematically a flow chart to operate one of the network nodes NN5, NN6 of FIG. 1. A step 1202 provides a discovering of at least one further road-side network node in the vicinity of the road-side network node as a gateway node, wherein the at least one further road-side node has the capability to exchange data across the cell-supported radio communications network and the adhoc radio communications network. A step 1204 provides an exchange of data across the cell-supported radio communications network and the adhoc radio communications network in dependence on the discovered at least one further road-side network node.

FIG. 13 depicts schematically two interacting road-side network nodes NN5 and NN6 of FIG. 1. The network node NN6 transmits a data entity DE7 via the adhoc radio channel and transmits a data entity DE8 via both the sidelink radio channel and the adhoc radio channel.

The network node NN5 receives the data entity DE8 from the further road-side network node NN6 via the sidelink channel and receive the data entity DE8 as a further data entity from the further road-side network node NN6 via the adhoc channel. The block 902 determined the similarity value in dependence on the first and second data entity in this case being the duplicate of DE8. The block 904 discovers that the at least one further road-side network node NN6 is a gateway node when the similarity value is above the threshold Th2.

The data entities may differ only in small time information given as information in the transmitted data. The data entities are similar when they have the same temporary identifier. The data entities are similar when they differ in small position information. The data entities are similar if an event indicated in a DENM message is identical and considered quite unlikely like a vehicle breakdown message.

As the data entity DE7 is received via the adhoc radio channel, the network node NN5 transmits the data entity on the sidelink radio channel and thus transfers the data entity DE7 from one technology to the other and in this way increases the reach of the data to potentially more vehicles.

FIG. 14 depicts schematically two interacting road-side network nodes NN5 and NN6 of FIG. 1. The further network node NN6 determines and transmits a data entity DE14 via the adhoc channel. The network node NN5 receives the data entity DE14 via the adhoc channel.

The network node NN6 inserts a first indication into the data entity DEM, which indicates that the network node NN6 is a gateway node. The network node NN5 receives the first indication and will insert the network node NN6 into a list of gateway nodes in the vicinity of network node NN5. The first indication may be transported as a bit it in a control section of data entity DE14.

According to an embodiment, the data entity DE14 is of a gateway announcement message type. In another embodiment, the first indication is transported via another message type.

According to an embodiment, the first indication is a gateway address a1.

The first indication that the transmitting road-side network node NN6 is a gateway node is signed by a hash to make it security proof. The hash is derived from a security certificate which is available only to gateway nodes. Therefore no fake gateways will appear in the network setup. Therefore, each gateway checks whether the indication is transmitted with a matching hash to increase security.

The data entity DE14 comprises a second indication i2 that the transmitting road-side network node has transmitted the contents of the third data entity on the sidelink radio channel and the adhoc radio channel. In the shown example, the network node NN6 has not transmitted the data entity DE 14 on the sidelink channel. Therefore, network node NN5 knows from the second indication set to Zero or false that an adhoc-only transmission has occurred on the side of network node NN6. In order to transfer the data entity DE 14 into the other network, the network node NN5 transmits via block 1402 the contents of the data entity DE 14 only via the sidelink channel when the third data has been received via the adhoc channel and the second indication is not true.

On the other hand, the network node NN5 will transmit the contents of a data entity only via the adhoc channel when the third data has been received via the sidelink channel and the second indication is not true.

A block 1404 determines a number of further road-side network nodes operating as a gateway in the vicinity of network node NN5. Block 1402 exchanges data across the cell-supported radio communications network and the adhoc radio communications network in inverse proportion to the number of further road-side network nodes operating as a gateway.

The invention claimed is:

1. A road-side network node, the road-side network node comprising:
    a processor;
    a memory;
    a first radio module for operating in a cell-supported radio communications network;
    a second radio module for operating in an adhoc radio communications network; and
    at least one antenna;
    wherein the road-side network node is configured to:
        receive a first data entity from a further road-side network node via a sidelink channel of the cell-supported radio communications network;
        receive a second data entity from the further road-side network node via an adhoc channel of the adhoc radio communications network;
        determine a similarity value in dependence on the first and second data entity;
        discover the at least one further road-side network node as being a gateway node, having the capability to exchange data across the cell-supported radio communications network and the adhoc radio communications network, when the similarity value is above a threshold; and
        exchange data across the cell-supported radio communications network and the adhoc radio communications network in dependence on the discovered at least one further road-side network node.

2. The road-side network node according to claim 1, wherein the road-side network node is configured to:
    receive a third data entity including a first indication that the transmitting road-side network node is a gateway node.

3. The road-side network node according to claim 2, wherein the road-side network node is configured to:
    receive the third data entity including a second indication that the transmitting road-side network node has transmitted contents of the third data entity on the sidelink radio channel and the adhoc radio channel.

4. The road-side network node according to claim 3, wherein the road-side network node is configured to:
    transmit the contents of the third data entity only via the sidelink channel when the third data has been received via the adhoc channel and the second indication is not true.

5. The road-side network node according to claim 3, wherein the road-side network node is configured to:

transmit the contents of the third data entity only via the adhoc channel when the third data has been received via the sidelink channel and the second indication is not true.

6. The road-side network node according to claim 1, wherein the road-side network node is configured to:
determine a number of further road-side network nodes operating as a gateway; and
exchange data across the cell-supported radio communications network and the adhoc radio communications network in inverse proportion to the number of further road-side network nodes operating as a gateway.

7. The road-side network node according to claim 1, wherein the adhoc radio communications network is a wireless local area network (WLAN).

8. The road-side network node according to claim 1, wherein the adhoc radio communications network is a wireless local area network (WLAN) operating according to an Institute of Electrical and Electronics Engineers (IEEE) 802.11 standard.

9. The road-side network node according to claim 8, wherein the cell-supported radio communications network is a cellular network operating according to a 3rd Generation Partnership Project (3GPP) standard.

10. The road-side network node according to claim 1, wherein the adhoc radio communications network is a wireless local area network (WLAN) operating according to an Institute of Electrical and Electronics Engineers (IEEE) 802.11p standard.

11. A method to operate a road-side network node in a cell-supported radio communications network and in an adhoc radio communications network, the method comprising the following steps:
receiving a first data entity from a further road-side network node via a sidelink channel of the cell-supported radio communications network;
receiving a second data entity from the further road-side network node via an adhoc channel of the adhoc radio communications network;
determining a similarity value in dependence on the first and second data entity;
discovering the at least one further road-side network node as being a gateway node, having the capability to exchange data across the cell-supported radio communications network and the adhoc radio communications network, when the similarity value is above a threshold; and
exchanging data across the cell-supported radio communications network and the adhoc radio communications network in dependence on the discovered at least one further road-side network node.

* * * * *

UNITED STATES PATENT AND TRADEMARK OFFICE
CERTIFICATE OF CORRECTION

PATENT NO. : 11,240,645 B2
APPLICATION NO. : 16/755266
DATED : February 1, 2022
INVENTOR(S) : Eckert et al.

Page 1 of 1

It is certified that error appears in the above-identified patent and that said Letters Patent is hereby corrected as shown below:

On the Title Page

In Item (30) Foreign Application Priority Data, replace:
"17201345"
With:
--17201345.0--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*